STABILIZED PHASE-SENSITIVE SERVO LOOP DEMODULATORS

Filed April 27, 1959 3 Sheets-Sheet 1

INVENTOR.
GLEN E. MILLER

BY
Reynolds, Beach & Christensen
ATTORNEYS

STABILIZED PHASE-SENSITIVE SERVO LOOP DEMODULATORS

INVENTOR.
GLEN E. MILLER
BY
Reynolds, Beach & Christensen
ATTORNEYS

INVENTOR.
GLEN E. MILLER
BY
Reynolds, Beach & Christensen
ATTORNEYS

United States Patent Office 3,099,798

Patented July 30, 1963

3,099,798

STABILIZED PHASE-SENSITIVE SERVO LOOP DEMODULATORS

Glen E. Miller, Kent, Wash., assignor to Boeing Airplane Company, Seattle, Wash., a corporation of Delaware Filed Apr. 27, 1959, Ser. No. 809,057
8 Claims. (Cl. 329—124)

This invention relates to improvements in phase-sensitive servo loop type demodulators and more particularly concerns means to improve the stability and response characteristics thereof. The invention is herein illustratively described by reference to its presently preferred form; however, it will be recognized that certain modifications and changes therein with respect to details may be made without departing from the underlying or essential features involved.

The lesser deterioration of signal-to-noise ratio incurred during demodulation makes the phase-sensitive servo loop demodulator an attractive system. This basic advantage is particularly important in demodulating weak signals in the presence of noise and stems from the fact that the phase-sensitive servo loop performs only essentially linear operations on the signal and noise components whereas with other systems, depending upon nonlinear circuit characteristics for their operation, some of the signal energy is converted into unusable side bands and the signal-to-noise ratio is diminshed. However, it has not been possible or practicable in many instances heretofore to use the phase sensitive servo loop demodulator in its previously known forms because of certain inherent instabilities caused by such factors as variable temperature, humidity, power supply voltage, etc.

A broad object of this invention is to overcome these causes of instability in such demodulators and to provide long-term drift stability therein.

A related object is to achieve the foregoing purposes while preserving the adaptability and flexibility of the circuit to suit different design requirements, such as required values for demodulator gain, for input or driving impedance of the variable frequency oscillator, etc.

A more specific object is to provide such a demodulator with stable means for frequency-modulating the variable-frequency oscillator in the loop without appreciable incidental amplitude modulation thereof and with less introduction of harmonic content in the variable frequency output thereof than heretofore.

In accordance with this invention the modulator portion of the demodulator loop circuit, which portion presents the variable reactance to the variable frequency oscillator by which to control the frequency of the latter, comprises a bridge-balanced circuit arrangement wherein both input and output are arranged to appear as symmetrical networks. By employing variable capacitance diodes in the output connected in parallel and with relatively opposite polarity to the oscillator input, oscillator harmonics are greatly reduced over that of a circuit employing a single variable capacitance diode. By employing variable capacitance diodes of substantially identical characteristics to vary control reactance of the variable-frequency oscillator residual amplitude modulation signals which may pass through these diodes cancel out and have no effect upon the variable frequency oscillator. Moreover, by applying the variable biasing effect to such variable capacitance diodes through effectively balanced differential voltage-regulating bridge means, drift and instability factors such as changes in circuit parameters due to temperature variations, or such as power supply variations, also balance out in the parallel circuit branches leading to the variable frequency oscillator input.

These and other features, objects and advantages of the invention will become more fully evident from the following description thereof by reference to the accompanying drawings.

Figure 1:
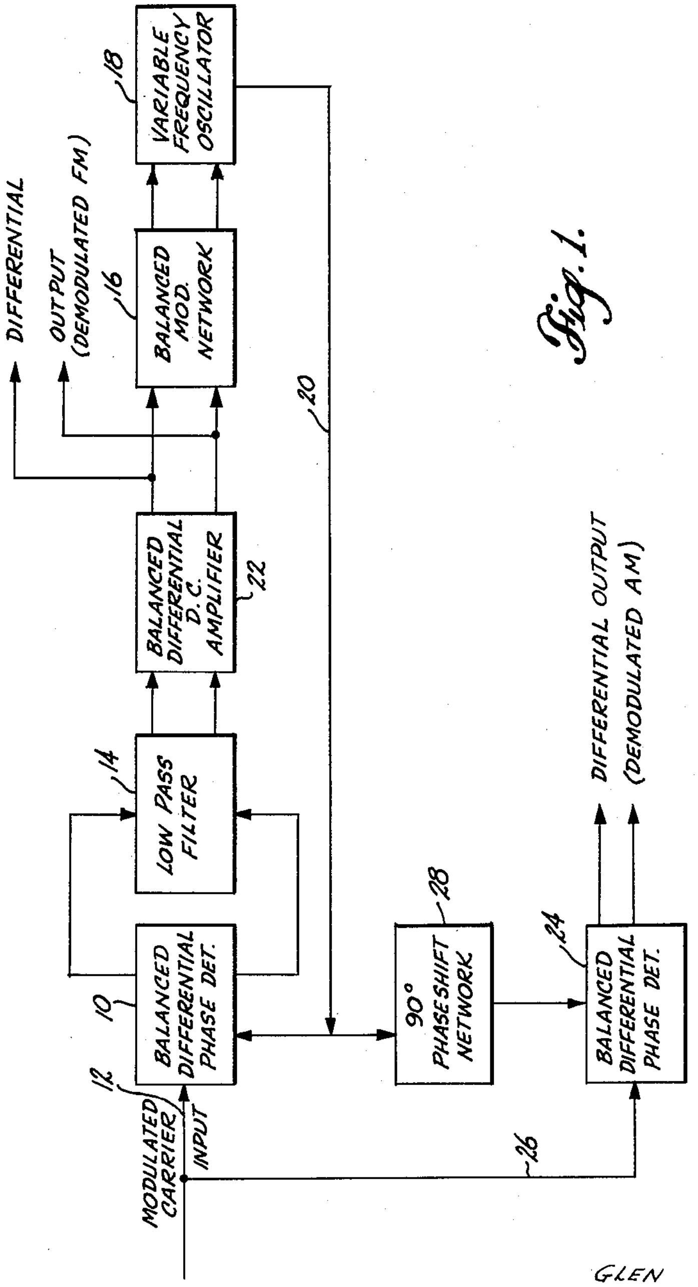
FIGURE 1 is a block diagram broadly illustrating the phase-sensitive servo loop demodulator for frequency demodulation with an auxiliary arrangement for amplitude demodulation.

The phase-sensitive servo loop as shown in FIGURE 1 comprises the phase detector 10 to which the modulated carrier is applied at 12, a low-pass filter 14, a balanced modulator network 16 driving the variable-frequency oscillator 18, and a feedback connection 20 from the output of the variable-frequency oscillator to the input of the phase sensitive detector 10. If desired, an amplifier 22 may be interposed between the low-pass filter and the modulator network. The phase detector 10 may be of any suitable or conventional type, but is preferably used in a balanced differential circuit form so as to minimize introduction of drift or instability factors in this portion of the system. Preferably the low-pass filter and the amplifier 22 driving the modulator network 16 are also balanced.

The basic theory of operation of such a servo loop is well known. The phase detector 10 combines the incoming modulated carrier and the signal from the local variable-frequency oscillator 18 in such manner that the output of phase detector 10 is proportional to the input carrier amplitude and to the cosine of the phase angle difference between these two signals. When this phase angle difference is 90° phase detector 10 produces zero output. If the phase angle difference becomes greater than 90° the output of phase detector 10 assumes a negative value and if the phase angle difference is less than 90° the output of phase detector 10 becomes positive. The deviation in frequency of the variable frequency oscillator from its frequency with no carrier input is proportional to the output of phase detector 10. Thus when a carrier is applied to the input phase detector 10 the servo follow-up action causes the variable frequency oscillator to operate at the same frequency as, and 90° out of phase with, the input carrier. The input carrier being frequency modulated, it follows that the variable frequency oscillator must also be frequency modulated and that the modulator input voltage may be taken as the demodulator system output since it must be an analog representation of the original modulation signal to be recovered from the carrier.

Phase detector 24, which may be electrically identical with phase detector 10, may be provided in case synchronous amplitude demodulation of the modulated carrier is also desired. This phase detector combines the input modulated carrier from conductor 26 with the 90-degree phase-shifted output of the variable-frequency oscillator 18 delivered through a phase shift network 28. Thus the output of phase detector 24 is proportional to the input carrier amplitude and to the sine of the phase angle difference between the two signals. Because the values of the sine of angles near 90 degrees remain near unity the output of phase detector 24 becomes substantially proportional to the input carrier amplitude independent of any frequency modulation that might be present.

Both balanced differential phase detectors may be of any conventional or suitable form as determined primarily by the freqency of operation, as may be the low-pass filter 14, the balanced differential D.C. amplifier 22, the phase shift network 28 and the variable frequency oscillator 18. The latter may comprise a Hartley or Colpitts circuit, for example, depending on preference and on operating frequency.

Figure 2:
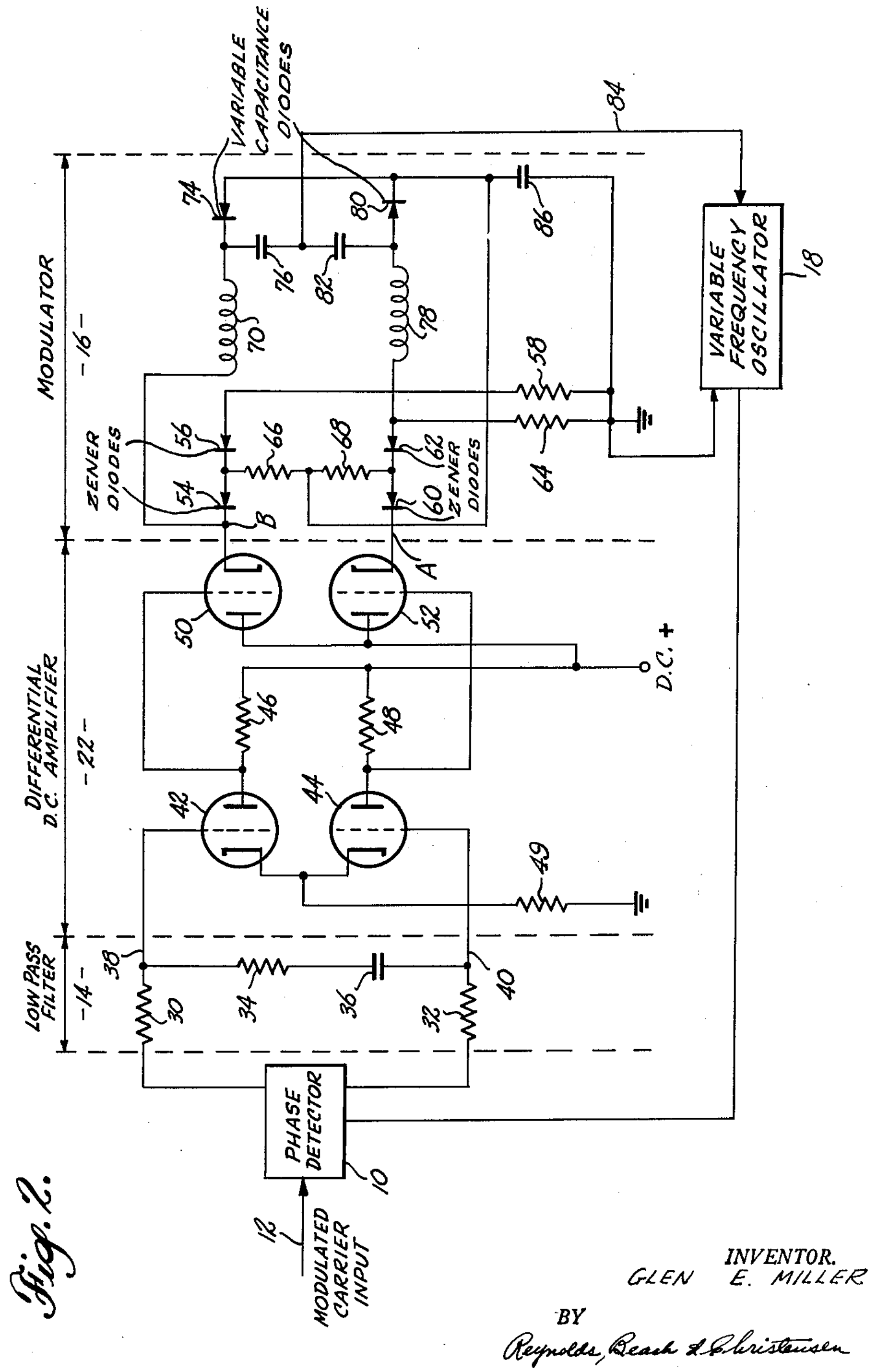
FIGURE 2 is a partially schematic loop circuit diagram illustrating a typical bridge-balanced modulator together with appropriate filter and driving circuits which latter may or may not be necessary in a given case depending upon design requirements (i.e. gain and band width).

Referring to FIGURE 2 the illustrated low-pass filter comprises equal resistances 30 and 32 interposed serially in the respective output leads 38 and 40 and shunted across by the serially connected resistance 34 and capacitance 36. Tubes 42 and 44 having plate load resistances 46 and 48 operate as differential D.C. amplifiers to provide the desired amount of loop gain. Resistance 49 in the common cathode return for the two tubes 42 and 44 provides signal cross-coupling tending to maintain a balance between the two sides of the amplifier circuit. Assuming tubes 42 and 44 are identical, resistances 46 and 48 are also made equal. Direct-coupled cathode-followers 50 and 52 transform the output impedance of the D.C. amplifier to a relatively low value for driving the modulator section efficiently. If the loop gain can be provided by a phase detector of sufficiently high level, or by an oscillator of sufficiently high deviation sensitivity, then obviously the additional gain provided by tubes 42 and 44 will be unnecessary. Likewise, if the existing driving source impedance is sufficiently low, tubes 50 and 52 are unnecessary.

The modulator network is arranged as a balanced bridge, with both input and output appearing as symmetrical, and with the reactive component of output impedance variable as a function of differential input voltage appearing at the cathodes of driver tubes 50 and 52. The cathode load circuit of tube 50 includes the series-connected Zener (i.e. producing substantially constant voltage drop with changes of current) diodes 54 and 56 and resistance 58. Similarly arranged Zener diodes 60 and 62 and resistance 64 are connected in the cathode circuit of tube 52. Equal series resistances 66 and 68 are connected in series between the junctions of these sets of diodes.

From the cathode of tube 50 a choke 70 is connected to the juncture between a variable capacitance 74 (diode) and a fixed capacitance 76. From the juncture of Zener diode 62 and resistance 64 a similar choke 78 is connected to the juncture between the variable capacitance 80 and a fixed capacitance 82 identical to the corresponding elements 74 and 76. Capacitances 76 and 82 are interconnected and their juncture comprises or is connected to the output conductor 84 by which the variable frequency oscillator is controlled. Variable-capacity diodes 74 and 80 are serially connected with unlike polarity and their juncture is connected to the juncture of resistances 66 and 68 as well as to ground through a bypass capacitance 86.

Diodes 54, 56, 60 and 62 are identical and operate in the Zener region of their characteristics. These may, for example, comprise IN469 type diodes. Diodes 74 and 80 may be of the VC47 type exhibiting a substantial change of capacitive reactance with change of applied back-bias and appearing as fairly high-Q capacitors whose capacity varies essentially as $$\frac{1}{\sqrt{E}}$$

where E is the value of reverse bias. Inductances 70 and 78 function as carrier-frequency chokes having a very high inductive reactance value compared with the capacitive reactance of diodes 74 and 80 at the operating frequency of the oscillator 18. Resistances 66 and 68 have a high value compared with the dynamic impedance of diodes 54, 56, 60 and 62, whereas identical capacitors 76 and 82 have capacitance values of the same order of magnitude as that of diodes 74 and 80. Capacitor 86 is a carrier by-pass and is large compared with the values of capacitances 76 and 82.

Typical circuit component values in the case of a 15 megacycle oscillator and the designated diode types are as follows:

| | | |
|---|---|---|
| Capacitances: | | |
| 76 | micromicrofarads | 33 |
| 82 | do | 33 |
| 86 | microfarads | 0.001 |
| Inductances: | | |
| 70 | microhenries | 100 |
| 78 | do | 100 |
| Resistances: | | |
| 66 | | 47K |
| 68 | | 47K |
| 64 | | 10K |
| 58 | | 10K |

Figure 3:
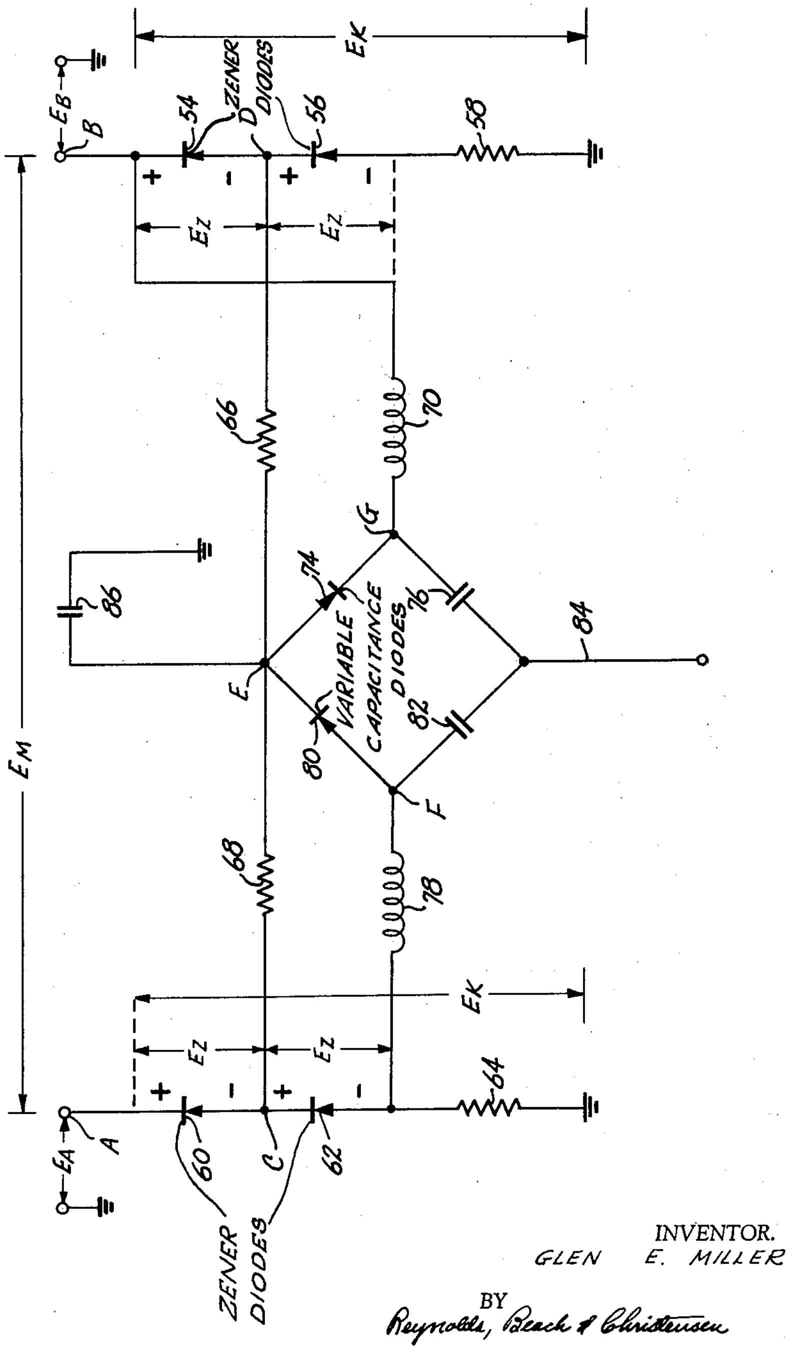
FIGURE 3 is a simplified schematic diagram illustrating the operating principle of the novel modulator portion of the system.

In FIGURE 3 the modulator circuit is reduced to a somewhat simpler form for purposes of analysis. Let it be assumed that the voltage appearing between points A and B consists of two voltages $E_A$ and $E_B$ (each referred to ground potential) and that each of these comprises a D.C. component $E_K$ due in the case of $E_A$ to quiescent current flow through resistance 64 and diodes 60 and 62, and in the case of $E_B$ flow through resistance 58 and diodes 54 and 56, and a varying modulation component $E_m$.

Then $$E_A = E_K + E_m$$

and $$E_B = E_K - E_m$$

the voltages at points C and D are respectively $$E_C = E_A - E_Z = E_K + E_m - E_Z$$

and $$E_D = E_B - E_Z = E_K - E_m - E_Z$$

the voltage at point E is $$E_E = \frac{E_C + E_D}{2}$$

$$E_E = E_K - E_Z$$

the voltages at points F and G are respectively $$E_F = E_A - 2E_Z = E_K + E_m - 2E_Z$$

and $$E_G = E_B = E_K - E_m$$

the voltages across variable condenser diodes 80 and 74 are respectively $$E_{E-F} = E_E - E_F = (E_K - E_Z) - (E_K + E_M - 2E_Z)$$
$$E_{E-F} = E_Z - E_m$$

and $$E_{G-E} = E_G - E_E = (E_E - E_m) - (E_K - E_Z)$$
$$E_{G-E} = E_Z - E_m$$

In other words, the reverse bias values on the two diodes 74 and 80 are equal and consist of a fixed bias component $E_Z$ and a varying bias component $E_m$.

Although the variation of capacitive reactance of diodes 80 and 74 is a non-linear function of the reverse bias, it may be assumed linear for small variations of bias, in which case the capacitive reactance of either diode 80 or 74 is $$X_{CR} \cong X_{CO} + KE_m$$

where $X_{CO}$ is the capacitive reactance at the static bias level of $E_Z$ and K is the slope of the reactance as a function of the bias characteristic at the particular operating point. Since at the oscillator frequency the impedances 66, 68, 70 and 78 are very high and that of capacitance 86 is very low the reactance appearing between the output conductor and ground is essentially $$X_H = \frac{X_{C3} + X_{CR6}}{2}$$

$$= \frac{X_{C3} + X_{CO} KE_M}{2}$$

where $X_{CR6}$ equals the capacitive reactance of diode 80 and $X_{C3}$ is the reactive component of capacitance 82.

Thus it will be evident that the reactive component $X_H$ of the impedance appearing across the output of the modulator is controllable as a function of $E_m$, the input modulation component, and that the desired frequency modulation of the oscillator is thereby accomplished. Moreover with capacitances 76 and 82 equal none of the modulation component $E_m$ itself reaches output conductor 84 to cause amplitude modulation of the oscillator. Also, with diodes 74 and 80 connected in parallel but with opposite polarity with relation to carrier frequency at conductor 84 there is a substantial reduction of oscillator harmonic content as compared with that in a modulator employing a single diode capacitance.

Since in the final equation expressing the output reactance of the modulator the term $E_K$ does not appear, it will be recognized that factors which might ordinarily cause drift or instability in the modulator, hence in the phase-sensitive servo loop, are canceled out as a result of the bridge-balanced differential modulator circuit arrangement. This result is attained to a high degree in practice to the extent care is exercised in initially balancing the system and providing conditions under which drifts on each side of the differential system tend to be equal. While thermal drift of capacitors 74 and 80 is not compensated it may be largely offset by selecting a proper temperature co-efficient for condensers 76 and 82 and mounting them in close proximity to condenser diodes 74 and 80 so as to undergo essentially the same or proportional temperature variations.

These and other aspects of the invention will be recognized from the foregoing description and example by those familiar with the art and its problems, who will further appreciate that the invention in its broader aspects is not confined alone to the specific preferred embodiment forming the basis for the present disclosure.

I claim as my invention:

1. In a phase sensitive servo loop demodulator, including a phase sensitive detector having an input arranged to be impressed with frequency modulated carrier to be demodulated, and having an output, and a frequency modulated variable-frequency oscillator having a modulation input and having an output connected to said phase sensitive detector for combining therein with the modulated carrier, modulator circuit means for applying output from said phase sensitive detector as a reactance modulation signal to the input of said variable-frequency oscillator thereby to vary the frequency of the latter and form a servo loop wherein oscillator frequency tracks the incoming carrier frequency, said modulator circuit means comprising opposing input terminals across which is impressed output signal from said detector, a pair of voltage-controlled variable reactance elements each having anode and cathode terminals, the anode terminal of one such element and the cathode terminal of the other such element being connected to one side of the oscillator input separate connections from the remaining terminals of said elements to the opposite side of the oscillator input, similar constant-reactance elements interposed in the respective connections between the remaining terminals of said variable reactance elements and said remaining side of the oscillator modulation input, and separate circuit means connected between the modulator input terminals and said remaining terminals of the variable reactance elements, respectively, said separate circuit means including means applying across each such variable reactance element a variable voltage component substantially proportional to output from said detector, the modulator circuit means appearing electrically substantially symmetrical both at its input and output.

2. The demodulator defined in claim 1, wherein the variable reactance elements comprise diodes, and the interconnected sides thereof are sides of unlike polarity.

3. The demodulator defined in claim 2, wherein the separate circuit means comprise separate quiescent voltage sources, each including a pair of voltage-regulation devices and a resistance connected serially, means connecting one such voltage regulator device of one pair across one of said variable reactance diodes, means connecting the other voltage regulator device of the other pair across the other variable reactance diode with like polarities in relation to said variable reactance diodes, and relatively high impedances interposed in the connections between said voltage regulator devices and variable reactance diodes.

4. In a phase sensitive servo loop demodulator, including a phase sensitive detector having an input arranged to be impressed with frequency modulated carrier to be demodulated, and having an output, and a frequency modulated variable-frequency oscillator having a modulation input and having an output connected to said phase sensitive detector for combining therein with the modulated carrier, modulator circuit means for applying output from said phase sensitive detector as a reactance modulation signal to the input of said variable-frequency oscillator thereby to vary the frequency of the latter and form a servo loop wherein oscillator frequency tracks the incoming carrier frequency, said modulator circuit means comprising opposing input terminals across which is impressed output signal from said detector, a pair of voltage-controlled variable reactance diodes means including, a relatively large capacitance commonly connecting the anode of one diode and the cathode of the other diode to one side of said oscillator input separate circuit connections respectively including, substantially equal capacitances connecting the remaining cathode and anode of said diodes to the opposite side of said oscillator input, which latter capacitances are each of the same order of capacitance as that of said diodes, two similar voltage dividers comprising two serially connected substantially constant-voltage elements and a resistance, the respective voltage dividers extending between each side of said modulator circuit input and a point of constant potential, a choke connected between the junction of one diode and its interposed capacitance and the junction between the resistance and adjacent constant-voltage element of one voltage divider, a choke connected between the junction of the other diode and its interposed capacitance and the side of the modulator circuit input which is connected to the other voltage divider, and resistances connected between the junction between said diodes and the respective junctions between the pairs of constant-voltage elements.

5. In a phase sensitive servo loop demodulator, including a phase sensitive detector having an input arranged to be impressed with modulated carrier to be demodulated, and having an output, and a frequency modulated variable-frequency oscillator having a modulation input and having an output connected to said phase sensitive detector for combining therein with the modulated carrier, modulator circuit means for applying output from said phase sensitive detector as a reactance modulation signal to the input of said variable-frequency oscillator thereby to vary the frequency of the latter and form a servo loop wherein oscillator frequency tracks the incoming carrier frequency, said modulator circuit means comprising opposing input terminals across which is impressed output signal from said detector, a pair of voltage-controlled variable reactance elements having terminals of opposite polarity commonly connected to one side of said oscillator input, separate circuit connections respectively including similar constant-reactance elements connecting the remaining terminals of said variable reactance elements and the other side of the oscillator modulation input, separate circuit means each connected between one of the input terminals of said modulator and one of said remaining terminals of said variable reactance elements, respectively, said separate circuit means including means applying across each such variable reactance element a variable voltage component substantially proportional to output from said detector, the modulator circuit means appearing electrically substantially symmetrical both at its input and output, a second phase-sensitive detector, having an input impressed with the modulated carrier, and 90-degree phase-shift circuit means applying the output of said oscillator to said second detector for combining therein with the modulated carrier to effect amplitude demodulation of the carrier.

6. A voltage-controlled variable reactance circuit comprising an input adapted to be impressed with variable voltage, an output across which to produce reactance variations corresponding to the input voltage variations, a pair of voltage-controlled variable reactance diodes each having anode and cathode, the cathode of one and the anode of the other being commonly connected to one side of said output, separate circuit connections respectively including relatively large capacitances connected between the remaining cathode and anode of said diodes and the other side of said output, respectively each of said capacitances having a capacity of the same order of magnitude as that of each of said diodes, two similar voltage dividers individually comprising two serially connected substantially constant-voltage elements and a resistance, the respective voltage dividers extending between each side of said input and a point of substantially constant potential, a choke connected between the junction of one diode and its connected capacitance and the junction between the resistance and adjacent constant-voltage element of one voltage divider, a choke connected between the junction of the other diode and its connected capacitance and the side of said input which is connected to the other voltage divider, and resistances connected between the first-mentioned anode and cathode respectively of the diodes and the respective interconnections between the constant-voltage elements of each pair.

7. A voltage-controlled variable reactance circuit comprising an input adapted to be impressed with variable voltage, an output having terminals across which to produce reactance variations corresponding to the input voltage variations, a pair of voltage-responsive variable-reactance elements each having anode and cathode, the anode of one and the cathode of the other being commonly connected to one output terminal, separate circuit means each including a constant-reactance element connected between the other output terminal and the remaining cathode and anode of the respective variable-reactance elements, and separate circuit means each connected between one side of the input and one of the said remaining cathode and anode of the variable-reactance elements, respectively, said separate circuit means including means applying across each such variable-reactance element a variable-voltage component proportional to input voltage, the variable-reactance circuit being electrically substantially symmetrical at both its input and output.

8. The circuit defined in claim 7, wherein the separate circuit means comprise separate quiescent voltage sources, each including a pair of voltage-regulation devices and a resistance connected serially, means connecting one such voltage regulator device of one pair across one of said variable reactance elements, means connecting the other voltage regulator device of the other pair across the other variable reactance element with like polarities in relation to said variable reactance elements, and relatively high impedances interposed in the connections between said voltage regulator devices and variable reactance elements.

References Cited in the file of this patent

UNITED STATES PATENTS

| | | |
|---|---|---|
| 2,332,540 | Travis | Oct. 26, 1943 |
| 2,559,023 | McCoy | July 3, 1951 |
| 2,678,386 | Bradley et al. | May 11, 1954 |
| 2,925,562 | Firestone | Feb. 10, 1960 |
| 2,964,637 | Keizer | Dec. 13, 1960 |